United States Patent
Kakimoto et al.

(10) Patent No.: US 9,148,081 B2
(45) Date of Patent: Sep. 29, 2015

(54) MOTOR DRIVER CONTROL DEVICE

(75) Inventors: Koichi Kakimoto, Chiyoda-ku (JP); Takumi Okuyama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/641,638

(22) PCT Filed: Jun. 16, 2010

(86) PCT No.: PCT/JP2010/060243
§ 371 (c)(1),
(2), (4) Date: Oct. 16, 2012

(87) PCT Pub. No.: WO2011/158356
PCT Pub. Date: Dec. 22, 2011

(65) Prior Publication Data
US 2013/0033219 A1  Feb. 7, 2013

(51) Int. Cl.
G05B 5/00 (2006.01)
G05B 15/00 (2006.01)
H02P 7/00 (2006.01)
H02P 8/00 (2006.01)
H02P 23/00 (2006.01)

(52) U.S. Cl.
CPC .......... *H02P 23/005* (2013.01); *H02P 23/0063* (2013.01); *H02P 23/0068* (2013.01)

(58) Field of Classification Search
USPC ........................................................ 318/466
See application file for complete search history.

(56) References Cited

U.S. PATENT DOCUMENTS

| | | | | | |
|---|---|---|---|---|---|
| 3,575,606 | A | * | 4/1971 | Bledsoe | 307/106 |
| 3,596,200 | A | * | 7/1971 | Fausey et al. | 327/172 |
| 3,602,994 | A | * | 9/1971 | Layman | 327/4 |
| 3,967,176 | A | * | 6/1976 | Wagener et al. | 318/603 |
| 5,121,040 | A | * | 6/1992 | Takizawa et al. | 318/574 |
| 5,442,273 | A | * | 8/1995 | Ikawa et al. | 318/799 |
| 5,491,397 | A | * | 2/1996 | Hirakawa | 318/696 |
| 5,572,419 | A | * | 11/1996 | Nishimura | 700/2 |
| 6,483,270 | B1 | * | 11/2002 | Miyazaki et al. | 318/700 |
| 7,049,779 | B2 | * | 5/2006 | Chen et al. | 318/400.09 |
| 2004/0046521 | A1 | * | 3/2004 | Abe et al. | 318/466 |

FOREIGN PATENT DOCUMENTS

| | | |
|---|---|---|
| JP | 5-78200 U | 10/1993 |
| JP | 6-292399 A | 10/1994 |
| JP | 2003-88187 A | 3/2003 |

OTHER PUBLICATIONS

Communication dated Aug. 5, 2014, issued by the State Intellectual Property Office of the People's Republic of China in counterpart Application No. 201080067477.1.

* cited by examiner

*Primary Examiner* — Paul Ip
*Assistant Examiner* — Devon Joseph
(74) *Attorney, Agent, or Firm* — Sughrue Mion, PLLC; Richard C. Turner

(57) ABSTRACT

A position-command-pulse generation unit generates a position command pulse to be output to a motor driver by advancing an initial phase thereof by a phase indicated by initial phase information preset in a device. The initial phase information indicates an arbitrary phase in a period of a half cycle of a first pulse of the position command pulse.

4 Claims, 3 Drawing Sheets

(1) WHEN INITIAL PHASE IS ADVANCED BY 0° IN A-PHASE/B-PHASE MODE (2) WHEN INITIAL PHASE IS ADVANCED BY 180° IN A-PHASE/B-PHASE MODE

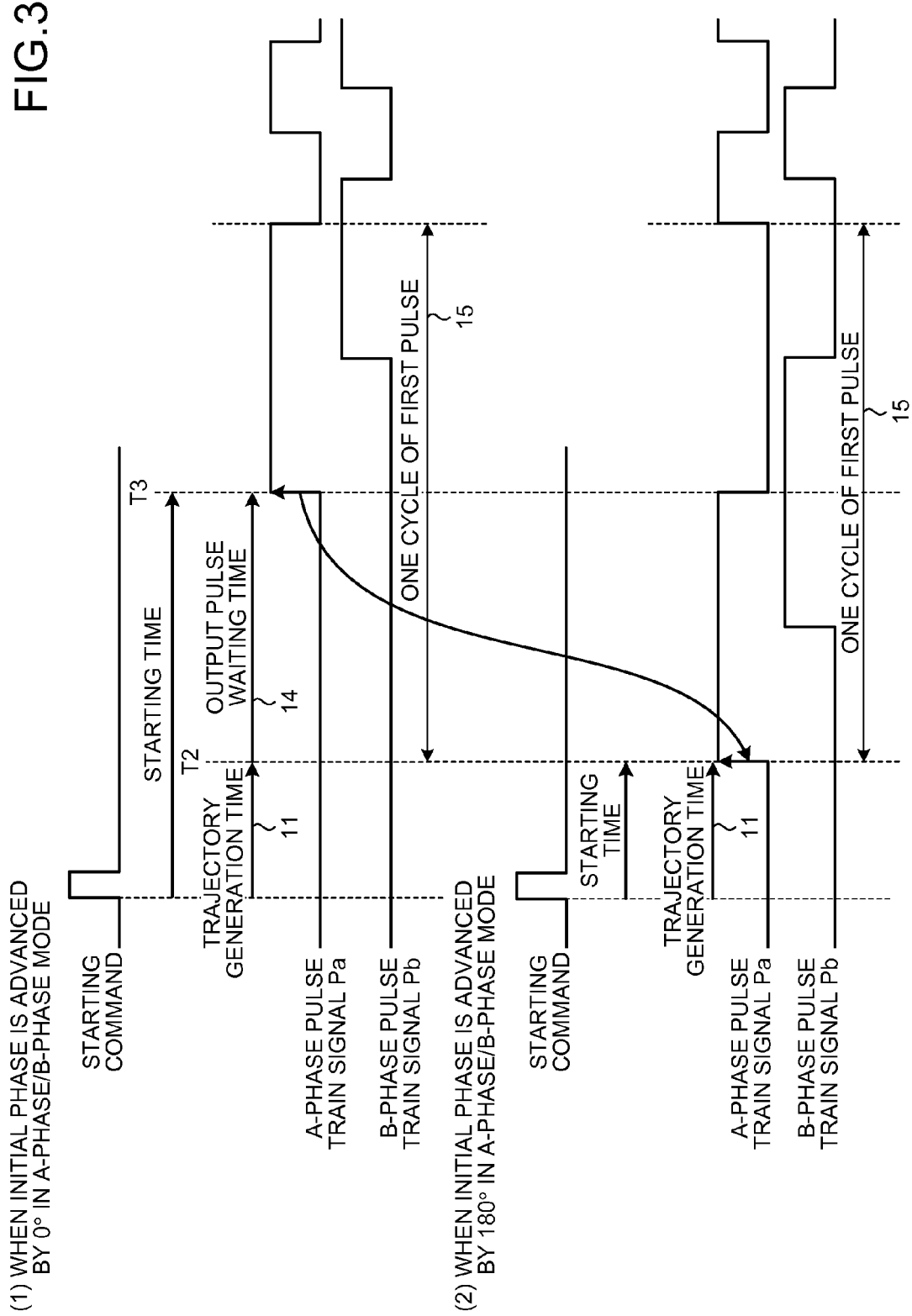

MOTOR DRIVER CONTROL DEVICE

CROSS REFERENCE TO RELATED APPLICATIONS

This application is a National Stage of International Application No. PCT/JP2010/060243, filed on Jun. 16, 2010, the contents of all of which are incorporated herein by reference in their entirety.

FIELD

The present invention relates to a motor driver control device, and more particularly to a motor driver control device suitable for reducing a takt time.

BACKGROUND

A motor driver control device controls a motor driver that drives a motor arranged on each axis of a positioning device to be used for machining/assembly, component mounting, and the like in a production process, thereby performing positioning control in the positioning device. As the motor driver control device, a programmable logic controller has been widely used. Therefore, in the present specification, the motor driver control device is referred to as a programmable logic controller.

There are various methods of controlling a motor driver by the programmable logic controller. The programmable logic controller intended by the present invention has such a configuration that a pulse train signal, which is a position command pulse, is output to a motor driver to control the motor driver. The position command pulse is generated according to a following procedure. That is, the programmable logic controller calculates and generates a positioning pattern of a motor driven by the motor driver based on positioning setting data including a target position and a target speed in positioning control, using a starting command as a trigger, converts the generated positioning pattern into a position command pulse according to one of three pulse output modes (A phase/B phase, CW/CCW, and PULSE/SIGN), and outputs the position command pulse. The starting command can be output in an execution process of a ladder program or input from outside.

CITATION LIST

Patent Literatures

Patent Literature 1: Japanese Patent Application Laid-open No. 2003-088187
Patent Literature 2: Japanese Patent Application Laid-open No. 6-292399

SUMMARY

Technical Problem

The motor driver is configured to execute motor control in response to a rising edge and a falling edge in each cycle of the position command pulse. The signal level in a first half of each cycle of the position command pulse output by a conventional programmable logic controller is the same as that of an initial state until the position command pulse is output. That is, the motor driver starts motor control at a change timing from the first half cycle to a second half cycle with respect to a first pulse of the position command pulse. A period of the first half cycle of the first pulse becomes a pulse output waiting time, in which starting of motor control is waited.

Therefore, in the conventional programmable logic controller, a period obtained by adding the "pulse output waiting time" to a "trajectory generation time" until the positioning pattern is generated by using the starting command as a trigger and then the position command pulse is output becomes a starting time of the positioning control, and starting of the positioning control is problematically delayed by the pulse output waiting time.

Conventionally, there have not been many applications requiring such high-speed starting that the pulse output waiting time, which is a starting waiting time of the motor driver, becomes a problem. With recent progress in the motor technology; however, applications requiring such high-speed starting that the pulse output waiting time becomes a problem are increasing, and countermeasures against this problem have been demanded.

Various proposals have been suggested to speed up starting of motor control (for example, Patent Literatures 1 and 2). However, these proposals address by modification or addition of hardware or software and cause a cost increase, which is not preferable.

The present invention has been achieved to solve the above problems, and an object of the present invention is to provide a motor driver control device that can reduce a starting time of positioning control without changing basic architectures of hardware and software.

Solution to Problem

To solve the above described problems and achieve the object, a motor driver control device includes: a program memory that has a control program describing positioning control and positioning setting data including a target position and a target speed in positioning control stored therein; a sequence execution unit that accesses the program memory according to an order of positioning control in a process of executing the control program and outputs the positioning setting data; a positioning-pattern generation unit that calculates and generates a positioning pattern of a motor driven by a motor driver based on the positioning setting data input from the sequence execution unit, using a starting command generated by the sequence execution unit as a trigger or using a starting command input from outside as a trigger; and a position-command-pulse generation unit that generates a position command pulse to be output to the motor driver from the positioning pattern generated by the positioning-pattern generation unit. Initial phase information of the position command pulse to be output to the motor driver is preset in the device, and the position-command-pulse generation unit generates the position command pulse by being advanced by a phase indicated by the initial phase information.

Advantageous Effects of Invention

According to the present invention, a starting time of the positioning control with respect to each axis of a positioning device can be reduced only by setting the initial phase information specifying an arbitrary initial phase in a range from 0° to 180° in the program memory without changing the conventional basic architecture of the hardware and software. Accordingly, when the motor driver control device according to the present invention is used in a production process, a takt time in an application device can be reduced.

BRIEF DESCRIPTION OF DRAWINGS

FIG. 3 is a timing chart for explaining another example of the operation for advancing an initial phase of a position command pulse.

DESCRIPTION OF EMBODIMENTS

Exemplary embodiments of a motor driver control device according to the present invention will be explained below in detail with reference to the accompanying drawings. The present invention is not limited to the embodiments.

Figure 1:
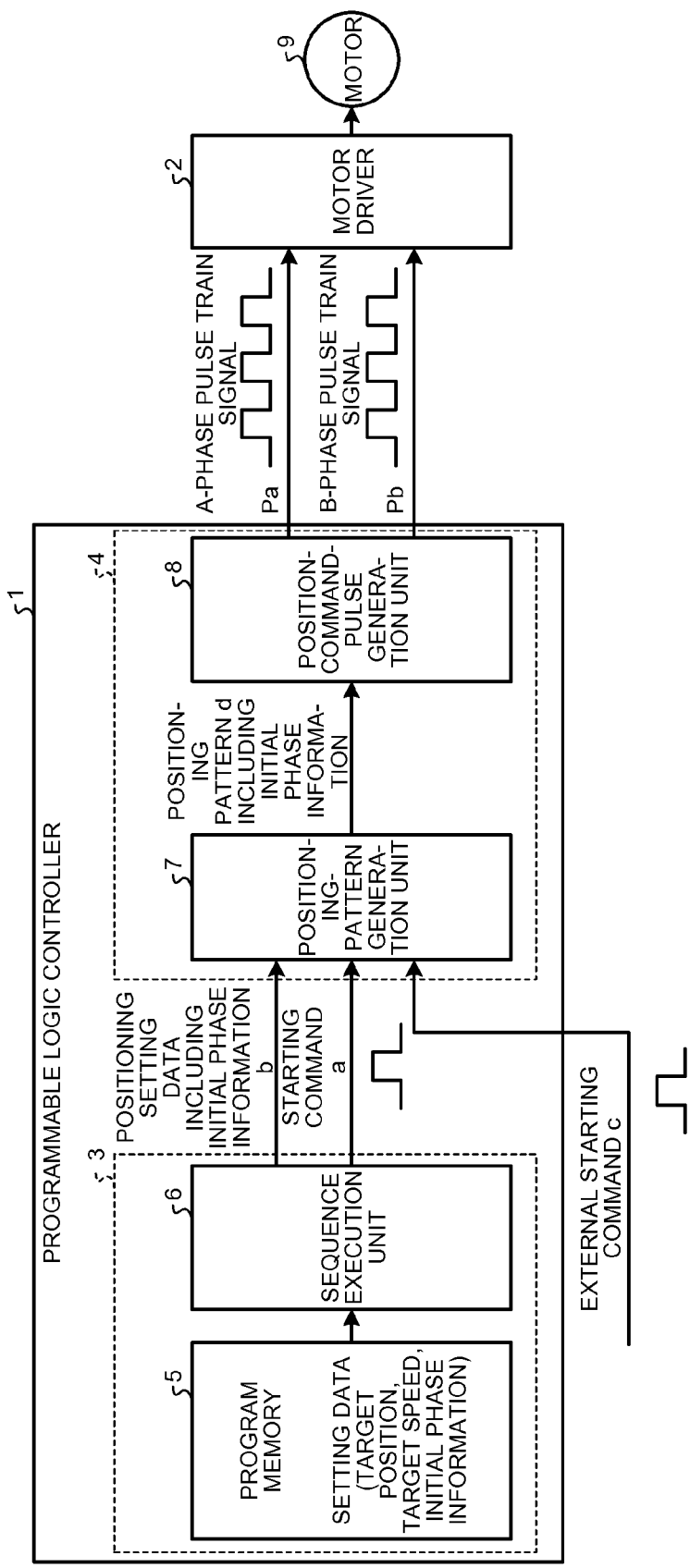
FIG. 1 is a block diagram of a configuration of a motor driver control device according to an embodiment of the present invention.

FIG. 1 is a block diagram of a configuration of a motor driver control device according to an embodiment of the present invention. In FIG. 1, a programmable logic controller 1 as the motor driver control device according to the present embodiment includes a sequence control unit 3 and a positioning control unit 4, as a configuration for controlling a motor driver 2.

The sequence control unit 3 includes a program memory 5 and a sequence execution unit 6. The positioning control unit 4 includes a positioning-pattern generation unit 7 and a position-command-pulse generation unit 8.

The configuration of the sequence control unit 3 will be explained first. The program memory 5 generally stores therein a control program (a ladder program) that describes positioning control, and setting data including a target position and a target speed in the positioning control. In the present embodiment, initial phase information of a position command pulse to be output to the motor driver 2 is also stored, for facilitating understanding. Because of being used in the position-command-pulse generation unit 8 as described later, the initial phase information may be preset in the positioning control unit 4 so that the position-command-pulse generation unit 8 can fetch the initial phase information.

The sequence execution unit 6 reads the ladder program from the program memory 5 and executes the program. In an execution process thereof, the sequence execution unit 6 outputs a starting command "a" to the positioning-pattern generation unit 7 and also outputs positioning setting data "b" read from the program memory 5 according to an order of the positioning control to the positioning-pattern generation unit 7. The positioning setting data "b" includes the initial phase information of the position command pulse.

The configuration of the positioning control unit 4 will be explained next. A starting command "c" may be input to the positioning-pattern generation unit 7 from outside. In this case, the positioning-pattern generation unit 7 selects one of the starting command "a" from the sequence execution unit 6 and the external starting command "c". The positioning-pattern generation unit 7 calculates and generates a positioning pattern of a motor 9 driven by the motor driver 2 based on the positioning setting data "b" input from the sequence execution unit 6, using the starting command "a" or the external starting command "c" as a trigger, and outputs a generated positioning pattern "d" to the position-command-pulse generation unit 8. The positioning pattern "d" includes the initial phase information of the position command pulse extracted from the positioning setting data "b".

The position-command-pulse generation unit 8 generally generates a position command pulse according to a pulse output mode matched to a specification of the motor driver 2 from the positioning pattern generated by the positioning-pattern generation unit 7, and outputs the position command pulse to the motor driver 2. As the pulse output mode, there are the A phase/B phase mode (90° phase difference pulse method), the CW/CCW mode (two-pulse method), and the PULSE/SIGN mode (common pulse method). In the present embodiment, the position-command-pulse generation unit 8 outputs a position command pulse according to the A phase/B phase mode, "an A-phase pulse train signal Pa and a B-phase pulse train signal Pb".

The motor driver 2 executes motor control in response to rising edges and falling edges of the A-phase/B-phase pulse train signals Pa and Pb. The motor 9 driven by the motor driver 2 may be a servo motor, a stepping motor, or the like arranged on each axis of a positioning device used in machining/assembly, component mounting, and the like in the production process.

Figure 2:
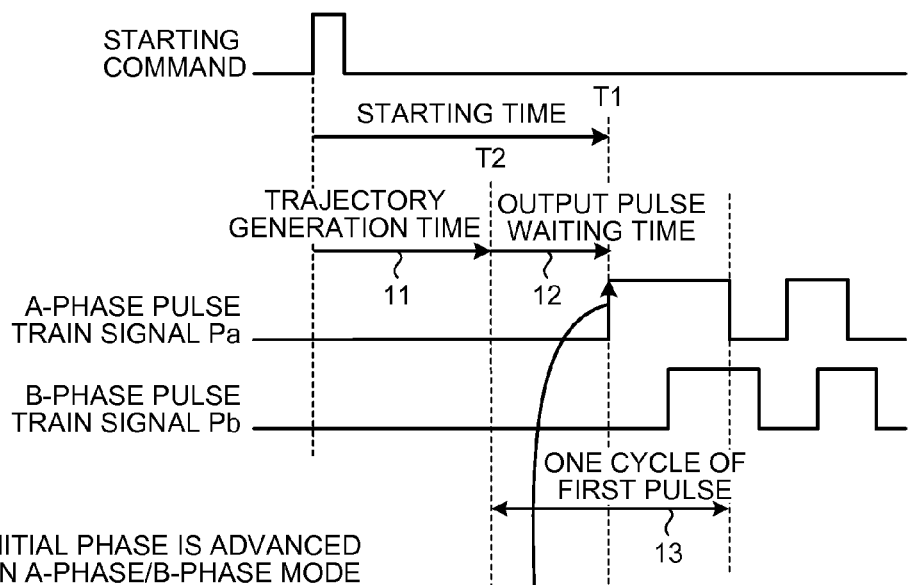
FIG. 2 is a timing chart for explaining an example of an operation for advancing an initial phase of a position command pulse.
Figure 2:
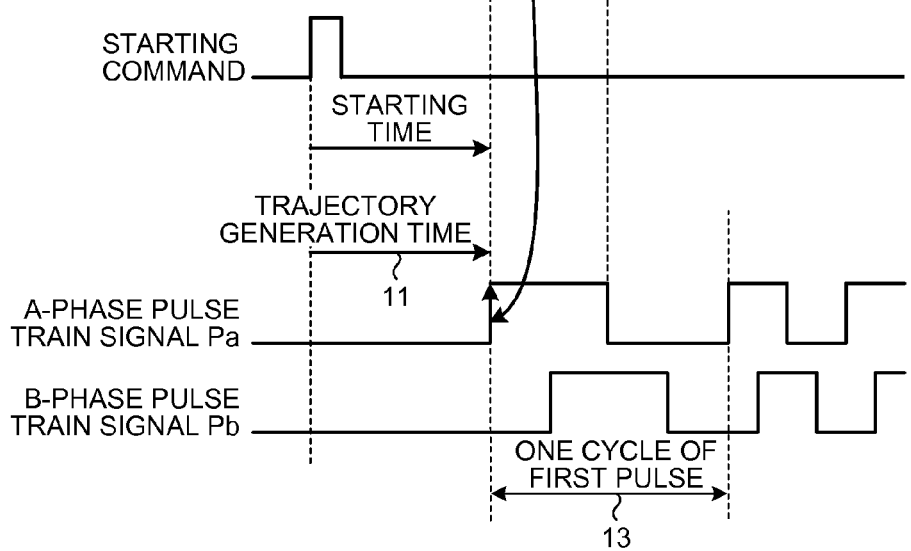

The position-command-pulse generation unit 8 according to the present embodiment applies the positioning pattern output from the positioning-pattern generation unit 7 and the initial phase information of the position command pulse included in the positioning pattern to a conventional circuit configuration, to generate the A-phase/B-phase pulse train signals Pa and Pb by advancing initial phases thereof from a conventional phase, "0°", by a phase indicated by the initial phase information, "an arbitrary phase in a range from 0° to 180°" (for example, see FIGS. 2 and 3).

An operation for advancing the initial phase of the position command pulse according to the present embodiment will be explained with reference to FIGS. 2 and 3. Each of FIGS. 2 and 3 is a timing chart for explaining an example of the operation for advancing the initial phase of the position command pulse. Particularly, FIG. 2 depicts an operation performed when a first pulse of the position command pulse has a short cycle, and FIG. 3 depicts an operation performed when a first pulse of the position command pulse has a long cycle (for example, at the time of S-pattern acceleration or deceleration, or when an acceleration time until reaching an instructed speed is long). While FIGS. 2 and 3 depict operations performed when the pulse output mode is the A phase/B phase mode, the same operations are performed when the pulse output mode is the CW/CCW mode or the PULSE/SIGN mode.

In (1) in FIG. 2 and (1) in FIG. 3, an operation performed when the initial phase is advanced by 0° in the A phase/B phase mode, that is, a conventional operation is illustrated. In (2) in FIG. 2 and (2) in FIG. 3, an operation performed when the initial phase is advanced by 180° in the A phase/B phase mode, that is, an operation performed when the initial phase is advanced by a half cycle of the position command pulse is illustrated.

As illustrated in FIGS. 2 and 3, the position-command-pulse generation unit 8 outputs the A-phase/B-phase pulse train signals Pa and Pb in such a phase relation that the A-phase pulse train signal Pa is an advanced phase and the B-phase pulse train signal Pb is delayed by 90° from the A-phase pulse train signal Pa. Initial states of signal lines of the A-phase/B-phase pulse train signals Pa and Pb until the position-command-pulse generation unit 8 starts pulse output are at a low level in the present embodiment. That is, there may be a case the initial states are set to a high level.

When the initial phase indicated by the initial phase information of the position command pulse set in the program memory 5 is 0°, the position-command-pulse generation unit 8 generates the A-phase/B-phase pulse train signals Pa and Pb as before. That is, in each cycle, the conventional A-phase/B- phase pulse train signals Pa and Pb have the same low level as in the initial state in the first half cycle and have a high level in the second half cycle. Accordingly, a first pulse of the A-phase pulse train signal Pa in the advanced phase, which is first input to the motor driver 2, maintains the same low level as in the initial state in the first half cycle and then rises to a high level. Therefore, the motor driver 2 starts the motor control at a change timing from the first half cycle to the second half cycle with respect to one cycle of the first pulse of the A-phase pulse train signal Pa, and waits for starting of the motor control in the period of the first half cycle.

Accordingly, as illustrated in (1) in FIG. 2, a starting time T1 of conventional positioning control becomes a time obtained by adding an output pulse waiting time 12 to a trajectory generation time 11. The trajectory generation time 11 is a time until the positioning pattern is calculated and generated using the starting command as a trigger and then the A-phase pulse train signal Pa is output. The output pulse waiting time 12 is a time of the first half cycle of one cycle 13 of the first pulse in the A-phase pulse train signal Pa.

Similarly, in (1) in FIG. 3, a starting time T3 of the conventional positioning control becomes a time obtained by adding an output pulse waiting time 14 to the trajectory generation time 11. However, because one cycle 15 of the first pulse in the A-phase pulse train signal Pa is longer than that illustrated in FIG. 2, the output pulse waiting time 14 is longer than the output pulse waiting time 12, and thus the starting time T3 is longer than the starting time T1.

When the initial phase indicated by the initial phase information of the position command pulse set in the program memory 5 is, for example, 180°, the position-command-pulse generation unit 8 generates the A-phase/B-phase pulse train signals Pa and Pb in such a form that the initial phases thereof are advanced by 180° than before. This simply corresponds to a case in which the A-phase/B-phase pulse train signals Pa and Pb are generated in a logically inverted form of the conventional A-phase/B-phase pulse train signals Pa and Pb. Therefore, when the position-command-pulse generation unit 8 starts pulse output, the first pulse of the A-phase pulse train signal Pa in the advanced phase has such a waveform that it rises from a low level in the initial state to a high level to start the first half cycle at an end of the trajectory generation time 11, and then falls to a low level to start the second half cycle when the period has passed, as illustrated in (2) in FIG. 2 and (2) in FIG. 3.

That is, when the initial phase of the position command pulse is specified as 180°, the motor driver 2 can start the motor control at a starting timing of the first half cycle of the first pulse of the A-phase pulse train signal Pa in the advanced phase. The starting time T2 of the positioning control becomes equal to the trajectory generation time 11 without including the output pulse waiting time 12 or 14 illustrated in (1) in FIG. 2 or (1) in FIG. 3. In this way, the starting time is considerably reduced from that in the case of the initial phase being 0°. Particularly, as illustrated in FIG. 3, a large reduction effect is obtained when the cycle of the first pulse in the A-phase pulse train signal Pa is long.

In this case, one cycle of the first pulse in the A-phase pulse train signal Pa is the same and the cycle 13 in the case illustrated in FIG. 2 and is the same and the cycle 15 in the case illustrated in FIG. 3 when the initial phase of the position command pulse is 0° and when the initial phase of the position command pulse is 180°.

It is understood that a time width of the output pulse waiting time 12 and 14 when the initial phase is 0° illustrated in (1) in FIG. 2 and (1) in FIG. 3 is an initial-phase adjustable width, and the initial phase of the position command pulse can be adjusted to an arbitrary phase in the range from 0° to a maximum of 180°.

As described above, according to the present embodiment, the starting time of positioning control with respect to each axis of the positioning device can be reduced by the programmable logic controller, only by setting the initial phase information that specifies an arbitrary initial phase in the range from 0° to 180° in the program memory without changing the conventional basic architectures of the hardware and software of the programmable logic controller.

Accordingly, when the programmable logic controller according to the present embodiment is used in the production process, a takt time in an application device can be reduced.

INDUSTRIAL APPLICABILITY

As described above, the motor driver control device according to the present invention is useful as a motor driver control device that can reduce a starting time of positioning control and is particularly suitable for reducing a takt time.

REFERENCE SIGNS LIST 1 programmable logic controller (motor driver control device)
2 motor driver
3 sequence control unit
4 positioning control unit
5 program memory
6 sequence execution unit
7 positioning-pattern generation unit
8 position-command-pulse generation unit
9 motor

The invention claimed is:
1. A motor driver control device comprising:
a sequence controller that includes:
  a program memory that stores therein:
    a control program describing positioning control;
    positioning setting data including a target position and a target speed in positioning control; and
    initial phase information of a position command pulse to be output to a motor driver, and
  a sequence execution unit that reads out the control program from the program memory and executes the control program, and
a positioning controller that includes:
  a positioning-pattern generation unit that calculates and generates a positioning pattern of a motor driven by the motor driver based on the positioning setting data including the initial phase information input from the sequence execution unit, using a first starting command generated by the sequence execution unit as a trigger or using a second starting command input from outside as a trigger; and
  a position-command-pulse generation unit that generates the position command pulse from the positioning pattern including the initial phase information, wherein
the initial phase information of the position command pulse to be output to the motor driver is preset in the program memory, and
the position-command-pulse generation unit generates the position command pulse by advancing by an initial phase in a range from 0° to 180° specified by the initial phase information.

2. The motor driver control device according to claim 1, wherein the initial phase information indicates an initial phase in a period of a half cycle of a first pulse of the position command pulse to be output to the motor driver.

3. A motor driver control device comprising:
   a sequence controller that includes:
      a program memory that stores therein:
         a control program describing positioning control; and
         positioning setting data including a target position and a target speed in positioning control; and
      a sequence execution unit that reads out the control program from the program memory and executes the control program, and
   a positioning controller that includes:
      a positioning-pattern generation unit that calculates and generates a positioning pattern of a motor driven by a motor driver based on the positioning setting data input from the sequence execution unit, using a first starting command generated by the sequence execution unit as a trigger or using a second starting command input from outside as a trigger; and
      a position-command-pulse generation unit that generates, from the positioning pattern including initial phase information, a position command pulse to be output to the motor driver, wherein
   the initial phase information of the position command pulse to be output to the motor driver is preset in the positioning controller, and
   the position-command-pulse generation unit generates the position command pulse by advancing by an initial phase in a range from 0° to 180° specified by the initial phase information.

4. The motor driver control device according to claim 3, wherein
   the initial phase information indicates an initial phase in period of a half cycle of a first pulse of the position command pulse configured to be output to the motor driver.

* * * * *